US008179237B2

(12) United States Patent
Yoshizawa (10) Patent No.: US 8,179,237 B2
(45) Date of Patent: May 15, 2012

(54) VEHICLE CONTROL APPARATUS AND VEHICLE PROVIDED WITH THE SAME

(75) Inventor: Akihiro Yoshizawa, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 936 days.

(21) Appl. No.: 11/831,708

(22) Filed: Jul. 31, 2007

(65) Prior Publication Data

US 2008/0174402 A1    Jul. 24, 2008

(30) Foreign Application Priority Data

Aug. 1, 2006  (JP) .................................. 2006-210025

(51) Int. Cl.
    *G08B 21/00*  (2006.01)
(52) U.S. Cl. ......... 340/426.15; 340/426.18; 340/426.13; 340/5.61; 307/10.1; 307/10.7; 180/282; 701/2
(58) Field of Classification Search ............. 340/426.15, 340/426.18, 426.13, 5.61; 307/10.1, 10.7; 180/282; 701/2
    See application file for complete search history.

(56) References Cited

U.S. PATENT DOCUMENTS

| 6,154,703 | A  | * | 11/2000 | Nakai et al. ................... 701/200 |
| 2004/0178902 | A1 | * | 9/2004 | Koike et al. ................. 340/457.1 |
| 2004/0252030 | A1 | * | 12/2004 | Trimble et al. .......... 340/825.36 |
| 2006/0187007 | A1 | * | 8/2006 | Konno et al. ............ 340/426.15 |
| 2007/0252696 | A1 | * | 11/2007 | Belisle et al. .............. 340/572.1 |

FOREIGN PATENT DOCUMENTS

| EP | 1 591 329 A1 | 11/2005 |
| EP | 1 669 264 A1 | 6/2006 |
| JP | 2003-64918 | 3/2003 |
| JP | 2004-114860 | 4/2004 |

\* cited by examiner

*Primary Examiner* — Toan N Pham
*Assistant Examiner* — Mark Rushing
(74) *Attorney, Agent, or Firm* — Rabin & Berdo, PC (57) ABSTRACT

A vehicle control apparatus that suppresses consumption of a battery of a mobile device. A transmitting and receiving circuit transmits to a smart key a drop detection code request signal for checking whether the smart key is located within a specified range from a motorcycle at specified intervals. The transmitting and receiving circuit receives a drop detection code signal transmitted from the smart key having received the drop detection code request signal. A control section stops the transmitting and receiving circuit from making transmission of the drop detection code request signal at specified intervals when the motorcycle is substantially in a stop state.

20 Claims, 6 Drawing Sheets

VEHICLE CONTROL APPARATUS AND VEHICLE PROVIDED WITH THE SAME

RELATED APPLICATIONS

This application claims the benefit of priority under 35 USC 119 of Japanese patent application no. 2006-210025, filed on Aug. 1, 2006, which application is hereby incorporated by reference in its entirety.

BACKGROUND OF THE INVENTION

1. Field of the Invention

This invention relates to a vehicle control apparatus and, in particular, to a vehicle control apparatus capable of transmitting and receiving a signal to and from a mobile device for permission authentication for use of a vehicle.

2. Description of Related Art

An electronic key system for a vehicle is known that is capable of transmitting and receiving a signal to and from a mobile device for permission authentication for use of the vehicle (see, for example, JP-A-2004-114860). In JP-A-2004-114860, after the engine is started, a request signal is transmitted from a vehicle-side transmitting circuit to an electronic key (mobile device) at predetermined intervals and a response signal is transmitted from the electronic key having received the request signal to a vehicle-side receiving circuit. Then, when the vehicle-side receiving circuit does not continuously receive response signals of a number larger than a specified number, there is a high possibility that the electronic key is not within a receivable range and there is a high possibility that a driver has dropped the electronic key, so the system lights an alarm light in order to let the driver know that he has dropped the electronic key. With this, it is possible to prevent the driver from losing a dropped electronic key.

However, in JP-A-2004-114860, after the engine is started, the request signal is transmitted at predetermined intervals from the vehicle-side transmitting circuit to the electronic key and the response signal is transmitted from the electronic key having received the request signal to the vehicle-side receiving circuit, so the request signal and the response signal are transmitted and received even when the vehicle is in a stop state. Here, also when the driver has dropped the electronic key in the case where the vehicle is substantially in the stop state, there is a high possibility that the electronic key will be located within a transmittable range near the vehicle, so there is a high possibility that the request signal and the response signal will be transmitted and received. For this reason, when the vehicle is substantially in the stop state, it is difficult to inform the driver that the electronic key has been dropped, so the need for conducting the communications between the vehicle-side transmitting circuit and receiving circuit and the electronic key is low. In this manner, in JP-A-2004-114860, even when the need for conducting the communications between the vehicle-side transmitting circuit and receiving circuit and the electronic key is low, the request signal and the response signal are transmitted and received at specified intervals. Thus, consumption of the battery of the electronic key is not suppressed.

SUMMARY OF THE INVENTION

This invention has been made to solve the foregoing problem and provides a vehicle control apparatus that suppresses the consumption of a battery of a mobile device.

A vehicle control apparatus according to a first aspect of the invention includes a transmitting means that transmits to a mobile device for permission authentication for use of a vehicle a code request signal for checking whether the mobile device is located within a specified range from the vehicle at specified intervals. Receiving means receive a code signal transmitted from the mobile device having received the code request signal. A control section stops the transmitting means from making transmission at specified intervals when the vehicle is substantially in a stop state in a state in which a communication system constructed of the transmitting means, the receiving means, and the mobile device is on.

In the vehicle control apparatus according to this first aspect, the control section stops the transmitting means from making transmission at specified intervals when the vehicle is substantially in the stop state in the state in which the communication system is on. Thus, when the need for conducting communication between the vehicle-side transmitting means and receiving means and the mobile device is thought to be low because detection of drop of the mobile device is difficult, communication between the vehicle-side transmitting means and receiving means and the mobile device is stopped to effectively suppress consumption of a battery of the mobile device.

In one embodiment, the code request signal and the code signal are signals for detecting drop of the mobile device. With this construction, the code request signal and the code signal can be simple short signals only for determining whether the mobile device is dropped. Thus, the interval of communication between the transmitting means and receiving means and the mobile device can be made short and battery consumption is further suppressed.

In one embodiment, when the speed of the vehicle is a specified value or less in the state in which the communication system is on, the control section assumes the vehicle to be substantially in the stop state and stops the transmitting means from making transmission at specified intervals. With this construction, it is possible to easily determine whether the vehicle is substantially in the stop state by the use of the speed of the vehicle.

In one embodiment, there is further provided vehicle speed detection means for easily detecting the speed of the vehicle. Thus, it is possible to more easily determine whether the vehicle is substantially in the stop state.

In one embodiment, when the vehicle is changed from a state in which the vehicle is substantially stopped to an operating state in the state in which the communication system is on, the control section controls the transmitting means so as to make transmission at specified intervals. Thus, communication between the vehicle-side transmitting means and receiving means and the mobile device is conducted only when the vehicle is in the operating state, which effectively suppresses consumption of the battery of the mobile device.

In one embodiment, when the speed of the vehicle is larger than a specified value in the state in which the communication system is on, the control section assumes the vehicle to be changed from the state in which the vehicle is substantially stopped to the operating state and controls the transmitting means so as to make transmission at specified intervals. With this construction, it is possible to easily determine by use of vehicle speed whether the vehicle is changed from the state in which the vehicle is substantially stopped to the operating state.

In this case, preferably, there is further provided vehicle speed detection means for detecting a speed of the vehicle. With this construction, the speed of the vehicle is easily detected and it is easily determined whether the state in which the vehicle is substantially stopped is changed to the operating state.

In one embodiment, there are further provided vehicle speed detection means and stop detection means disposed separately from the vehicle speed detection means that detect whether the vehicle is substantially in the stop state. With this construction, whether the vehicle is substantially in the stop state is easily detected by use of the stop detection means.

In one embodiment, the stop detection means includes a stand state detection part for detecting whether a parking stand of the vehicle is in a parking state. With this construction, it can be easily detected by the use of the stand state detection part whether the stand is in the parking state. Thus, it can be further easily determined whether the vehicle is substantially in the stop state.

A vehicle control apparatus according to a second aspect of this invention includes a transmitting means that transmits to a mobile device for permission authentication for use of a vehicle a code request signal for checking whether the mobile device is located within a specified range from the vehicle at specified intervals. Receiving means receives a code signal transmitted from the mobile device having received the code request signal. A control section controls the transmitting means to make transmission at specified intervals when the vehicle is substantially in an operating state in a state in which a communication system comprising the transmitting means, the receiving means, and the mobile device is on.

In the vehicle control apparatus according to the second aspect, the control section controls the transmitting means to make transmission at specified intervals when the vehicle is substantially in the operating state in the state in which the communication system is on. Thus, only when the need for communication between the vehicle-side transmitting means and receiving means and the mobile device is thought to be high, and the vehicle is substantially in the operating state, are communications between the vehicle-side transmitting means and receiving means and the mobile device conducted. This effectively suppresses consumption of the battery of the mobile device.

In one embodiment, when the speed of the vehicle is larger than a specified value in the state in which the communication system is on, the control section assumes the vehicle to be substantially in the operating state and controls the transmitting means to make transmission at specified intervals. Thus, it is easily determined by use of the speed of the vehicle whether the vehicle is substantially in the operating state.

A vehicle according to a third aspect of this invention includes the vehicle control apparatus of any one of the foregoing constructions. A vehicle with this construction effectively suppresses consumption of the battery of the mobile device.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are now described with reference to the drawings.

(First Embodiment)

Figure 1:
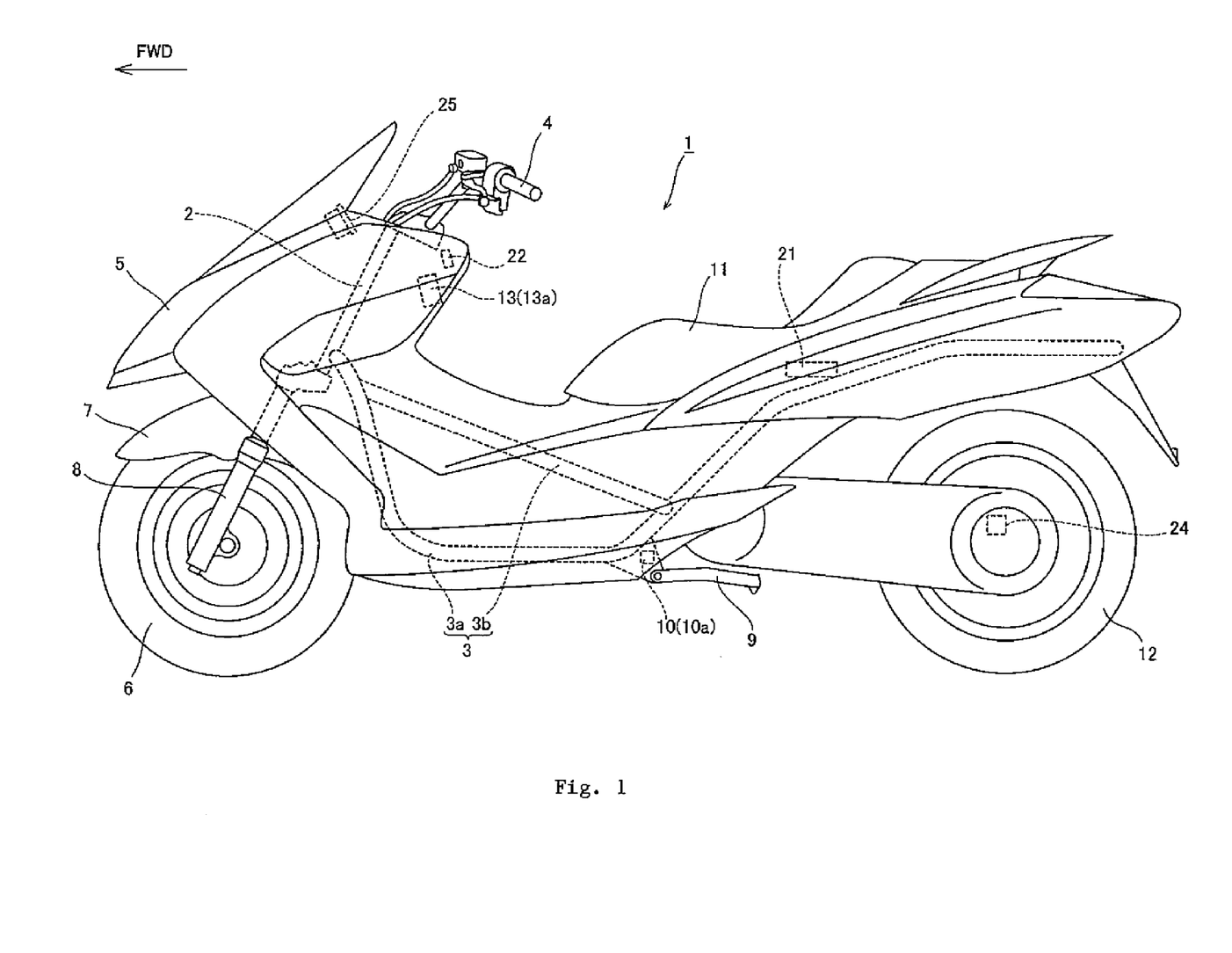
FIG. 1 is a side view of a motorcycle according to a first embodiment of the present invention.
Figure 2:
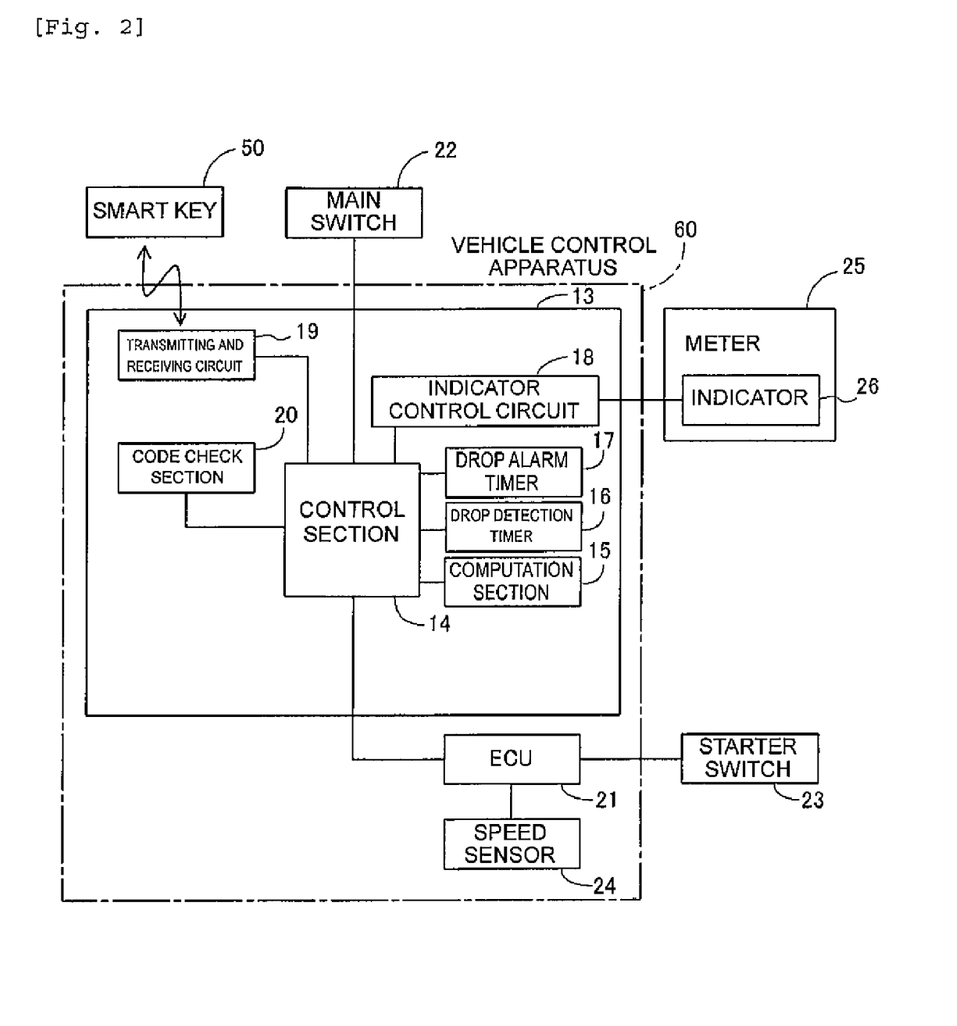
FIG. 2 is a block diagram of a vehicle control apparatus according to the first embodiment of the invention.

FIG. 1 is a side view of a motorcycle 1 according to a first embodiment of the present invention. FIG. 2 is a block diagram of a vehicle control apparatus of motorcycle 1. Arrow FWD in FIG. 1 denotes a front direction in which motorcycle 1 runs.

In motorcycle 1, a main frame 3 is disposed backward of a head pipe 2. Main frame 3 includes a frame main part 3a and a support part 3b supporting upper two points of frame main part 3a. Head pipe 2 and main frame 3 comprise the vehicle frame.

A handle 4 having a throttle secured thereto is disposed above head pipe 2. A front cowl 5 covers the front of head pipe 2. A front wheel 6 and a front fender 7 disposed above front wheel 6 are disposed below front cowl 5. Front wheel 6 is rotatably secured to the lower portions of a pair of front forks 8.

A parking stand 9 and a stand state detection part 10 for detecting whether stand 9 is in a parking state are disposed below the central portion of main frame 3. A seat 11 is disposed above the rear portion of main frame 3. A rear wheel 12 is rotatably disposed below the rear end of main frame 3.

A control unit 13 is disposed backward of head pipe 2. Control unit 13, as shown in FIG. 2, is provided with a control section 14 and parts connected to control section 14, the parts including a computation section 15, a drop detection timer 16, a drop alarm timer 17, an indicator control circuit 18, a transmitting and receiving circuit 19, and a code check section 20. Transmitting and receiving circuit 19 is one example of a "transmitting means" and a "receiving means" of the invention.

Control section 14 is connected to an ECU (engine control unit) 21 disposed below seat 11 and a main switch 22 disposed below a central portion in a direction of width of handle 4. Control section 14 and ECU 21 conduct serial communications by the use of an SCI (serial communication interface). ECU 21 is connected to a starter switch 23 secured to handle 4 and to a speed sensor 24 disposed near rear wheel 12 for detecting the number of revolutions of rear wheel 12. A vehicle control apparatus 60 comprises ECU 21, speed sensor 24, and control unit 13. Speed sensor 24 is one example of a "vehicle speed detection means" of the invention. ECU 21 transmits that starter switch 23 is turned on when starter switch 23 is turned on to control section 14. ECU 21 also transmits the number of revolutions of rear wheel 12, which is detected by speed sensor 24, to control section 14.

Control section 14 conducts communications between transmitting and receiving circuit 19 and a smart key 50 for permission authentication for use of motorcycle 1 when main switch 22 is turned on. When smart key 50 is determined to be a smart key corresponding to motorcycle 1, control section 14 brings a communication system between transmitting and receiving circuit 19 and smart key 50 to an ON state, the communication system being used for detecting drop of smart key 50. Smart key 50 is one example of a "mobile device" of the invention.

Control section 14 stops conducting communication for detecting drop of smart key 50 when a vehicle speed is 0 km/h in a state in which the communication system between transmitting and receiving circuit 19 and smart key 50 is ON.

Computation section 15 computes a vehicle speed on the basis of the number of revolutions of rear wheel 12 transmitted from control section 14 (ECU 21).

Drop detection timer 16 has a subtraction counter length set for 10 seconds. When drop detection timer 16 is turned on by control section 14, the subtraction counter is brought to 0 after 10 seconds. Drop alarm timer 17 has a subtraction counter length set for 60 seconds. When drop alarm timer 17 is turned on by control section 14, the subtraction counter is brought to 0 after 60 seconds.

Indicator control circuit 18 is connected to an indicator 26 disposed in a meter 25 arranged backward of front cowl 5. Indicator control circuit 18 blinks or turns off indicator 26 by a signal from control section 14.

Transmitting and receiving circuit 19 conducts communication with smart key 50. Smart key 50 has a battery built therein and has an individual recognition code and a drop detection code recorded therein. The individual recognition code is used for determining whether smart key 50 corresponds to motorcycle 1, and the drop detection code is used for checking whether smart key 50 is located within a specified range (about 1 m) from motorcycle 1 in order to determine whether the driver has dropped smart key 50. The individual recognition code is a complex long code so as to enhance an antitheft function, whereas the drop detection code is a simple short code only for determining whether smart key 50 is located within the specified range (about 1 m) from motorcycle 1. That is, an individual recognition code signal used when the individual recognition code is transmitted from smart key 50 to transmitting and receiving circuit 19 is a complex long code signal, whereas a drop detection code signal used when the drop detection code is transmitted is a simple short code signal.

Transmitting and receiving circuit 19 transmits an individual recognition code request signal for requesting smart key 50 to transmit the individual recognition code, and transmits a drop detection code request signal for requesting smart key 50 to transmit the drop detection code. Each of the individual recognition code request signal and the drop detection code request signal is constructed of a simple short signal.

Transmitting and receiving circuit 19 is controlled by control section 14 to transmit the individual recognition code request signal to smart key 50 when main switch 22 is pressed. Transmitting and receiving circuit 19 transmits the drop detection code request signal to smart key 50 when the subtraction counter of drop detection timer 16 is brought to 0 in the state in which the communication system between transmitting and receiving circuit 19 and smart key 50 is ON, the communication system being used for detecting drop of smart key 50. Transmitting and receiving circuit 19 transmits a signal received from smart key 50 to control section 14.

When the signal received from smart key 50 is transmitted from transmitting and receiving circuit 19 to control section 14, code check section 20 acquires the signal from control section 14. The same individual recognition code and drop detection code are recorded in code check section 20 as are recorded in smart key 50. When the individual recognition code or the drop detection code is transmitted from control section 14 (smart key 50), code check section 20 determines whether the transmitted individual recognition code or drop detection code corresponds to the individual recognition code or the drop detection code that are recorded in code check section 20.

Figure 3:
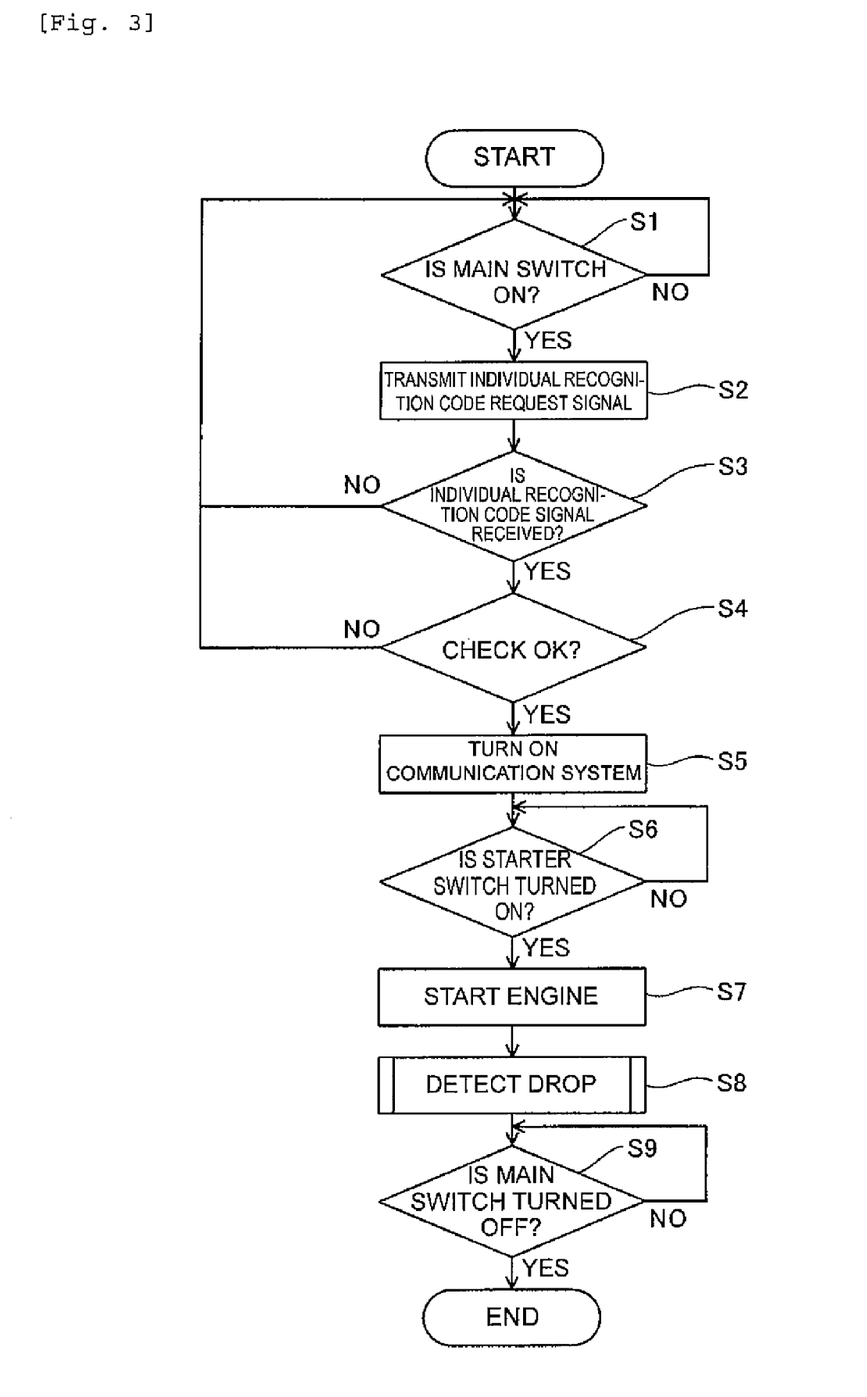
FIG. 3 is a flow chart of the flow of processing of the vehicle control apparatus according to the first embodiment of the invention.

FIG. 3 shows the flow of processing of vehicle control apparatus 60 according to the first embodiment of the invention. The flow of processing of vehicle control apparatus 60 is described in detail with reference to FIGS. 2 and 3.

In step S1 of FIG. 3, it is determined whether main switch 22 is turned ON. If main switch 22 is not turned ON, step S1 is repeated. If main switch 22 is turned ON, this fact is transmitted to control section 14 and the routine proceeds to step S2. In step S2, the individual recognition code request signal is transmitted from transmitting and receiving circuit 19 to smart key 50. When smart key 50 is located within a transmittable range (about 1 m) near control unit 13 (transmitting and receiving circuit 19), smart key 50 receives the individual recognition code request signal from transmitting and receiving circuit 19 and transmits the individual recognition code signal to transmitting and receiving circuit 19.

In step S3, it is determined whether the individual recognition code signal is received by transmitting and receiving circuit 19. If the individual recognition code signal is not received, the routine returns to step S1. If the individual recognition code signal is received, the routine proceeds to step S4.

In step S4, the received individual recognition code signal is transmitted to code check section 20 via control section 14 and code check section 20 determines whether the individual recognition code corresponding to the individual recognition code signal received from smart key 50 (control section 14) corresponds to the individual recognition code previously recorded in code check section 20. If the individual recognition codes do not correspond, the routine returns to step S1. If the individual recognition codes correspond, the routine proceeds step S5. In step S5, the communication system between transmitting and receiving circuit 19 and smart key 50 is brought to an ON state and is used for detecting drop of smart key 50.

In step S6, it is determined whether starter switch 23 is turned ON. If starter switch 23 is not turned ON, step S6 is repeated. If starter switch 23 is turned ON, this fact is transmitted to control section 14 via ECU 21 and the routine proceeds to step S7. In step S7, the engine is started.

In step S8, the drop of smart key 50 is detected. In step S9, it is determined whether main switch 22 is turned OFF. If main switch 22 is not turned OFF, step S9 is repeated. If main switch 22 is turned OFF, the processing is finished.

Figure 4:
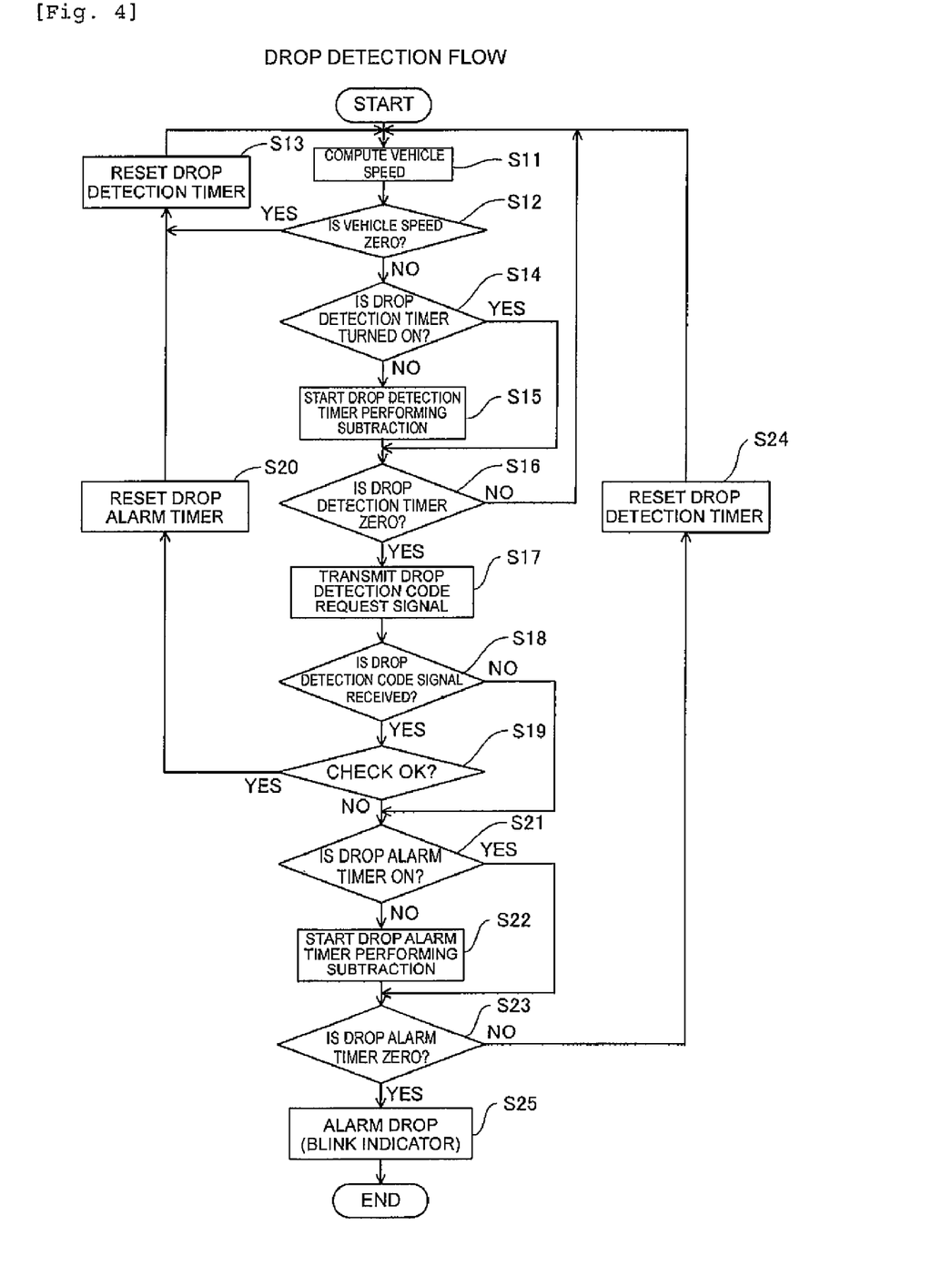
FIG. 4 is a flow chart of the detecting drop step of FIG. 3.

FIG. 4 describes in detail the flow of processing of detecting drop step S8 of FIG. 3. Detecting drop step S8 according to the first embodiment of the invention is described in detail with reference to FIGS. 1-4.

In step S11 of FIG. 4, the number of revolutions of rear wheel 12 detected by speed sensor 24 is transmitted from control section 14 to computation section 15, which computes a vehicle speed. In step S12, it is determined whether the vehicle speed is 0 km/h. If the vehicle speed is 0 km/h, the routine proceeds to step S13. In step S13, drop detection timer 16 is reset and then the routine returns to step S11. If the vehicle speed is not 0 km/h, the routine proceeds to step S14.

In step S14, it is determined whether drop detection timer 16 set for 10 seconds is ON. If drop detection timer 16 is not ON, the routine proceeds to step S15. In step S15, drop detection timer 16 is turned ON and the subtraction counter starts subtraction, and then the routine proceeds to step S16. If drop detection timer 16 is ON, the routine proceeds to step S16.

In step S16, it is determined whether the subtraction counter of drop detection timer 16 set for 10 seconds is 0. If the subtraction counter of drop detection timer 16 is not 0, the routine returns to step S11. If the subtraction counter of drop detection timer 16 is 0, the routine proceeds to step S17.

In step S17, the drop detection code request signal is transmitted from transmitting and receiving circuit 19 to smart key 50. That is, when the vehicle speed is larger than 0 km/h in the state in which the communication system between transmitting and receiving circuit 19 and smart key 50 is ON, the drop detection code request signal is transmitted every about 10 seconds from transmitting and receiving circuit 19. When smart key 50 is located within a transmittable range (about 1 m) near control unit 13 (transmitting and receiving circuit 19), smart key 50 receives the drop detection code request signal from transmitting and receiving circuit 19 and transmits the drop detection code signal to transmitting and receiving circuit 19.

In step S18, it is determined whether the drop detection code signal is received by transmitting and receiving circuit 19 within a specified period. If the drop detection code signal is received, the routine proceeds to step S19. In step S19, the received drop detection code signal is transmitted to code check section 20 via control section 14, and code check section 20 determines whether the drop detection code corresponding to the drop detection code signal received from smart key 50 (control section 14) corresponds to the drop detection code previously recorded in code check section 20. If the drop detection codes correspond, the routine proceeds to step S20. In step S20, drop alarm timer 17 is reset and the routine returns to step S13. If the drop detection codes do not correspond, the routine proceeds to step S21. If it is determined in step S18 that the drop detection code signal is not received, the routine proceeds to step S21.

In step S21, it is determined whether drop alarm timer 17 set for 60 seconds is ON. If drop alarm timer 17 is not ON, the routine proceeds to step S22. In step S22, drop alarm timer 17 is turned ON and the subtraction counter starts subtraction. Then, the routine proceeds to step S23. If drop alarm timer 17 is ON, the routine proceeds to step S23.

In step S23, it is determined whether the subtraction counter of drop alarm timer 17 set for 60 seconds is 0. If the subtraction counter of drop alarm timer 17 is not 0, the routine proceeds to step S24. In step S24, drop detection timer 16 is reset and the routine returns to step S11. If the subtraction counter of drop alarm timer 17 is 0, the routine proceeds to step S25.

In step S25, indicator 26 for the smart key system disposed in meter 25 is blinked by indicator control circuit 18 to signal that it is highly likely that smart key 50 has been dropped.

Then, as described above, step S9 of FIG. 3 is repeated until main switch 22 is turned OFF. If main switch 22 is turned OFF, the processing is finished.

In the first embodiment, control section 14 stops transmitting and receiving circuit 19 from transmitting the drop detection code request signal at predetermined intervals (about 10 seconds) when the vehicle speed is 0 km/h in the state in which the communication system for detecting the drop of smart key 50 is ON. Thus, when the speed of motorcycle 1 is 0 km/h, communication between transmitting and receiving circuit 19 and smart key 50 is stopped. When the vehicle speed is 0 km/h, there is also a high possibility that a dropped smart key will be within a transmittable range (about 1 m) near control unit 13 (transmitting and receiving circuit 19), so there is a high possibility that the drop detection code request signal and the drop detection code signal will be transmitted and received. For this reason, when the vehicle speed is 0 km/h and the driver has dropped smart key 50, it is difficult to inform the driver that the driver has dropped smart key 50, so the need for conducting communication between transmitting and receiving circuit 19 and smart key 50 is low. Thus, when the need for conducting communication between transmitting and receiving circuit 19 and smart key 50 is low, it is desirable to stop conducting communication between transmitting and receiving circuit 19 and smart key 50 to effectively suppress consumption of the battery of smart key 50.

Furthermore, in the first embodiment, the drop detection code request signal and the drop detection code signal are simple short signals for determining whether smart key 50 is dropped, so the time required for conducting communication between transmitting and receiving circuit 19 and smart key 50 is short. Thus, battery consumption is further suppressed.

(Second Embodiment)

Figure 5:
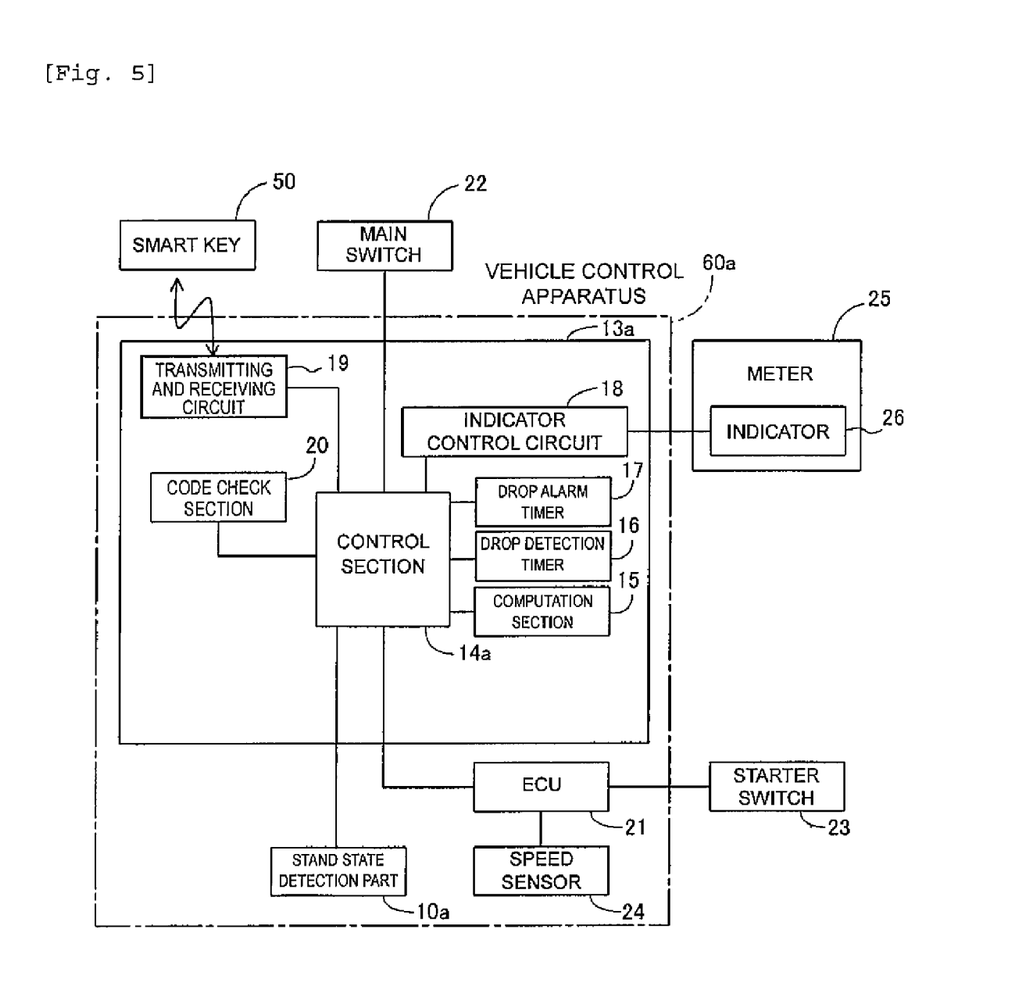
FIG. 5 is a block diagram of a vehicle control apparatus according to a second embodiment of the invention.

FIG. 5 depicts a vehicle control apparatus according to a second embodiment of the invention. In the second embodiment, which is described with reference to FIGS. 1 and 5, it is determined by the vehicle speed and the stand state whether the motorcycle is substantially in the stop state, and then it is determined whether communication for detecting the drop of smart key 50 is conducted.

In the second embodiment of the invention, as shown in FIG. 5, a control unit 13a includes a control section 14a and parts connected to control section 14a, the parts including computation section 15, drop detection timer 16, drop alarm timer 17, indicator control circuit 18, transmitting and receiving circuit 19, and code check section 20.

Control section 14a is connected to a stand state detection part 10a. Stand state detection part 10a is one example of a "stop detection means" of the invention. Stand state detection part 10a transmits whether stand 9 (see FIG. 1) is in a parking state to control section 14a.

In the second embodiment, a vehicle control apparatus 60a comprises ECU 21, speed sensor 24, control unit 13a and stand state detection part 10a.

When stand 9 is in the parking state or the vehicle speed is 5 km/h or less in the state in which the communication system between transmitting and receiving circuit 19 and smart key 50 used for detecting the drop of smart key 50 is ON, motorcycle 1 is assumed to be substantially in the stop state and communication for detecting the drop of smart key 50 is stopped.

Otherwise, the construction of the second embodiment is the same as the first embodiment.

Figure 6:
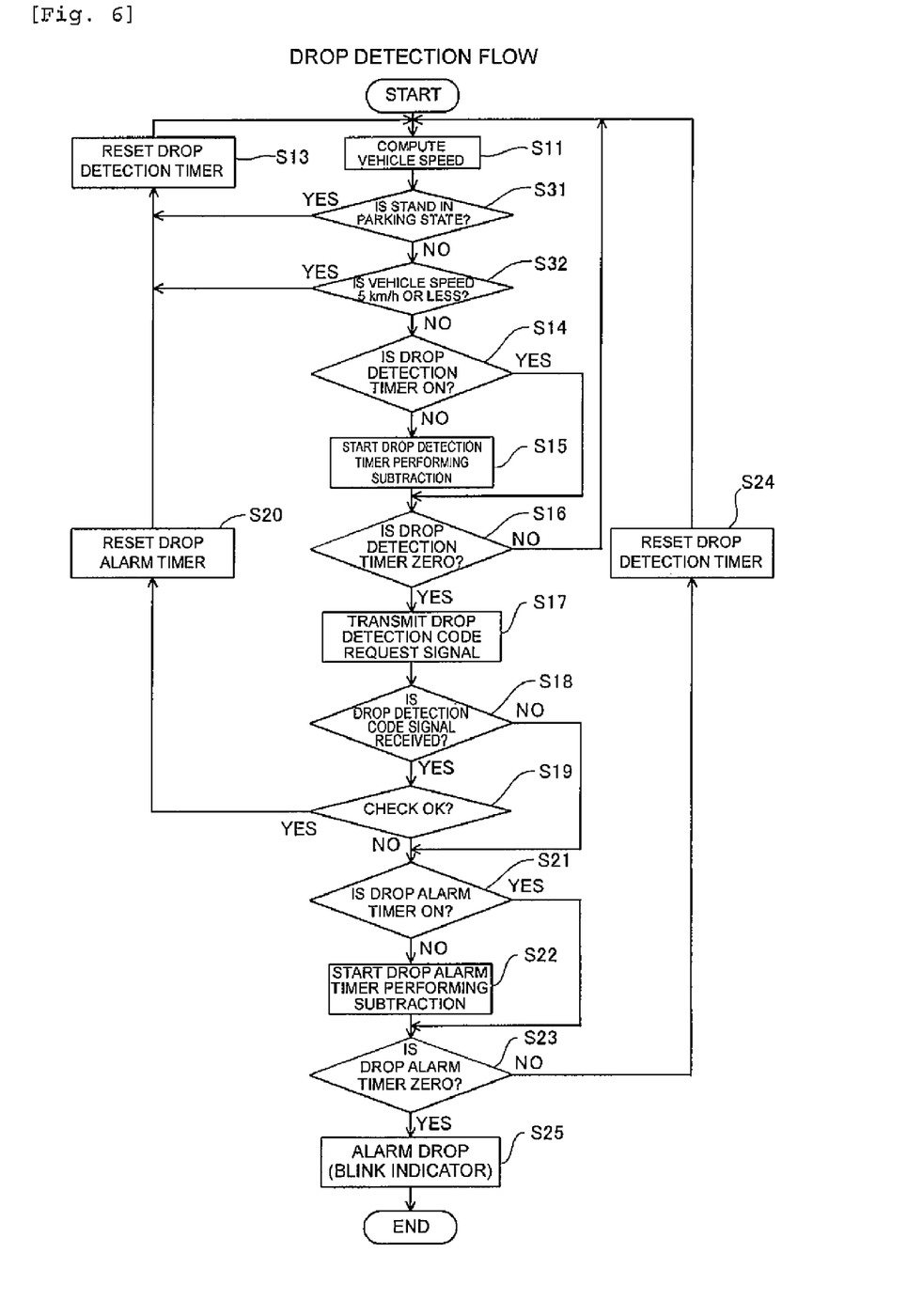
FIG. 6 is a flow chart of the detecting drop step according to the second embodiment of the invention.

FIG. 6 shows in detail the detecting drop step according to the second embodiment. The flow of processing of the detecting drop step according to the second embodiment is described with reference to FIGS. 1, 5 and 6.

In step S31 of FIG. 6, the state of stand 9 is transmitted to control section 14a by stand state detection part 10a and it is determined whether stand 9 is in the parking state. If stand 9 is in the parking state, the routine proceeds to step S13. Drop detection timer 16 is reset in step S13 and the routine then returns to step S11. If stand 9 is not in the parking state, the routine proceeds to step S32.

It is determined in step S32 whether the vehicle speed is 5 km/h or less. If the vehicle speed is 5 km/h or less, the routine proceeds to step S13. Drop detection timer 16 is reset in step S13 and the routine then returns to step S11. If the vehicle speed is not 5 km/h or less, the routine proceeds to step S14.

The remaining processing flow of the detecting drop step of the second embodiment is the same as that in the first embodiment.

In the second embodiment, control section 14a assumes motorcycle 1 to be substantially in the stop state and stops transmitting and receiving circuit 19 from transmitting the drop detection code request signal at intervals of a specified period (about 10 seconds) when stand 9 is in the parking state or when the vehicle speed is 5 km/h or less in the state in which the communication system for detecting the drop of smart key 50 is ON. Thus, when stand 9 is in the parking state or the vehicle speed is 5 km/h or less, communication between transmitting and receiving circuit 19 and smart key 50 is stopped. When stand 9 is in the parking state or the vehicle speed is 5 km/h or less, there is a high possibility that a dropped smart key 50 will be located within a transmittable range (about 1 m) near control unit 13a (transmitting and receiving circuit 19), so there is a high possibility that the drop detection code request signal and the drop detection code signal will be transmitted and received. For this reason, when stand 9 is in the parking state or the vehicle speed is 5 km/h or less, communication between transmitting and receiving circuit 19 and smart key 50 is not conducted. This effectively suppresses consumption of the battery of smart key 50.

Other effects in the second embodiment are the same as those in the first embodiment.

The embodiments described herein are by way of example only and do not limit the invention. The scope of the present invention is defined by the claims and includes all meaning equivalent to the scope of the claims and modifications within the scope of the claims.

For example, in the foregoing embodiments, the motorcycle has been shown as an example of a vehicle provided with the vehicle control apparatus. However, the present invention is not limited to the motorcycle but can be applied to other vehicles such as an automobile, a bicycle, a three-wheeled vehicle, and an ATV (all terrain vehicle) provided with the vehicle control apparatus.

Moreover, an example has been described of determining whether the vehicle speed is 0 km/h in order to determine whether the motorcycle is substantially in the stop state. However, the invention is not so limited and other values such as 3 km/h, 5 km/h, etc. may be used to determine whether the motorcycle is substantially in the stop state.

Further, an example of detecting the vehicle speed in order to determine whether the motorcycle is substantially in the stop state has been described. However, the invention is not so limited, and something other than vehicle speed may be detected to determine whether the motorcycle is substantially in the stop state. For example, it may be detected whether the main stand or the side stand is in the parking state or whether the throttle is closed. Further, it may be detected whether the driver sits on the seat or whether the seat is opened. Still further, it may be detected whether the parking brake is on or whether the gear is at the neutral position. As shown in the second embodiment, a combination of vehicle speed and other detection results may be used to determine whether the motorcycle is substantially in the stop state.

Further, in the foregoing embodiments, examples have been described in which subtraction counters of the drop detection timer and the drop alarm timer are set for 10 seconds and 60 seconds, respectively. However, the present invention is not limited to these examples, and the subtraction counters of the drop detection timer and the drop alarm timer may be set for values other than 10 seconds and 60 seconds, or may be changed according to the running state.

The invention claimed is:

1. A vehicle control apparatus comprising:
   a drop detection timer having a detection counter that periodically decreases;
   transmitting means that transmits to a mobile device, for permission authentication for use of a vehicle, a code request signal for checking whether the mobile device is located within a specified range from the vehicle at specified intervals that each correspond to the detection counter reaching a predetermined value;
   receiving means that receives a code signal transmitted from the mobile device having received the code request signal; and
   a control section that stops the transmitting means from making any transmission to the mobile device when the vehicle is substantially in a stop state and in a state in which a communication system constructed of the transmitting means, the receiving means, and the mobile device is on, and resets the detection counter when the vehicle is in the stop state.

2. The vehicle control apparatus as claimed in claim 1, wherein the code request signal and the code signal are signals for detecting drop of the mobile device.

3. The vehicle control apparatus as claimed in claim 1, wherein when a speed of the vehicle is a specified value or less in a state in which the communication system is on, the control section assumes the vehicle to be substantially in the stop state and stops the transmitting means from making any transmission to the mobile device.

4. The vehicle control apparatus as claimed in claim 3, further comprising vehicle speed detection means for detecting a speed of the vehicle.

5. The vehicle control apparatus as claimed in claim 1, wherein when the vehicle is changed from a state in which the vehicle is substantially stopped to an operating state in the state in which the communication system is on, the control section controls the transmitting means so as to make transmission at the specified intervals.

6. The vehicle control apparatus as claimed in claim 5, wherein when a speed of the vehicle is larger than a specified value in the state in which the communication system is on, the control section assumes the vehicle to be changed from the state in which the vehicle is substantially stopped to the operating state and controls the transmitting means so as to make transmission at the specified intervals.

7. The vehicle control apparatus as claimed in claim 6, further comprising vehicle speed detection means for detecting a speed of the vehicle.

8. The vehicle control apparatus as claimed in claim 1, further comprising:
   vehicle speed detection means for detecting a speed of the vehicle; and
   stop detection means that is disposed separately from the vehicle speed detection means and detects whether the vehicle is substantially in the stop state.

9. The vehicle control apparatus as claimed in claim 8, wherein the stop detection means includes a stand state detection part for detecting whether a parking stand of the vehicle is in a parking state.

10. The vehicle control apparatus as claimed in claim 1, wherein the mobile device is a smart key.

11. A motorcycle comprising the vehicle control apparatus as claimed in claim 1.

12. The vehicle control apparatus as claimed in claim 1, further comprising:
    vehicle speed detection means for detecting a speed of the vehicle; and
    stop detection means that is disposed separately from the vehicle speed detection means and detects whether the vehicle is substantially in the stop state,
    wherein the control section stops the transmitting means from making any transmission to the mobile device based at least partly on a state of the stop detection means.

13. The vehicle control apparatus as claimed in claim 1, further comprising:
    vehicle speed detection means for detecting a speed of the vehicle; and stop detection means that is disposed separately from the vehicle speed detection means and detects whether the vehicle is substantially in the stop state, wherein the control section stops the transmitting means from making any transmission to the mobile device in a case where the stop detection means detects the vehicle is substantially in the stop state or the vehicle speed detection means detects the vehicle speed is less than a predetermined speed.

14. The vehicle control apparatus according to claim 1, further including an indicator that is activated when the control section determines that the mobile device is not within the specified range, so as to notify a user.

15. A vehicle control apparatus comprising:
   a drop detection timer having a detection counter that periodically decreases;
   transmitting means that transmits to a mobile device, for permission authentication for use of a vehicle, a code request signal for checking whether the mobile device is located within a specified range from the vehicle, the code request signal being transmitted to the mobile device at specified intervals that each correspond to the detection counter reaching a predetermined value;
   receiving means that receives a code signal transmitted from the mobile device having received the code request signal;
   a control section that controls the transmitting means so as to make transmission at the specified intervals when the vehicle is substantially in an operating state, and in a state in which a communication system constructed of the transmitting means, the receiving means, and the mobile device is on; and
   stop detection means that detects whether the vehicle is substantially in a stop state, wherein the control section further controls the transmitting means to stop the transmitting means from making any transmission to the mobile device when the vehicle is substantially in the stop state, based on the stop detection means detecting that the vehicle is substantially in the stop state, and resets the detection counter when the vehicle is in the stop state.

16. The vehicle control apparatus as claimed in claim 15, wherein when a speed of the vehicle is larger than a specified value in the state in which the communication system is on, the control section assumes the vehicle to be substantially in the operating state to control the transmitting means so as to make transmission at the specified intervals.

17. The vehicle control apparatus as claimed in claim 15, wherein the mobile device is a smart key.

18. A vehicle comprising the vehicle control apparatus as claimed in claim 15.

19. The vehicle control apparatus according to claim 15, further including an indicator that is activated when the control section determines that the mobile device is not within the specified range, so as to notify a user.

20. A vehicle control apparatus comprising:
   a drop detection timer having a detection counter that periodically decreases;
   transmitting means that transmits to a mobile device, for permission authentication for use of a vehicle, a code request signal for checking whether the mobile device is located within a specified range from the vehicle at specified intervals that each correspond to the detection counter reaching a predetermined value;
   receiving means that receives a code signal transmitted from the mobile device having received the code request signal;
   a drop alarm timer having an alarm counter that periodically decreases;
   an indicator that, when activated, indicates that the mobile device is not within the specified range; and
   a control section that, in a state in which a communication system constructed of the transmitting means, the receiving means, and the mobile device is on, is configured to stop the transmitting means from making any transmission to the mobile device when the vehicle is substantially in a stop state that is determined based at least in part upon whether a parking stand of the vehicle is in a parking state or whether a vehicle speed is less than a predetermined value, and reset the detection counter timer when the vehicle is in the stop state, control the transmitting means to transmit to the mobile device the code request signal at the specified intervals when the vehicle is not in the stop state, and the alarm counter is above zero, the control section further resetting the detection counter each time one of the specified intervals is reached, and activate the indicator when the code signal is not received by the receiving means and the alarm counter is zero.

* * * * *